USO11178319B2

(12) United States Patent
Li et al.

(10) Patent No.: US 11,178,319 B2
(45) Date of Patent: Nov. 16, 2021

(54) COMPUTING DEVICE

(71) Applicant: Lenovo (Singapore) Pte. Ltd., Singapore (SG)

(72) Inventors: Scott Wentao Li, Cary, NC (US); Russell Speight VanBlon, Raleigh, NC (US); Robert James Kapinos, Durham, NC (US); Timothy Winthrop Kingsbury, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/687,438

(22) Filed: Nov. 18, 2019

(65) Prior Publication Data
US 2021/0149272 A1 May 20, 2021

(51) Int. Cl.
*H04N 5/225* (2006.01)
*G03B 11/04* (2021.01)

(52) U.S. Cl.
CPC .......... *H04N 5/2254* (2013.01); *G03B 11/041* (2013.01); *H04N 5/2257* (2013.01)

(58) Field of Classification Search
None
See application file for complete search history.

(56) References Cited

U.S. PATENT DOCUMENTS

| | | | | |
|---|---|---|---|---|
| 6,877,058 B2 * | 4/2005 | Sato | ...................... | G06F 1/3215 710/301 |
| 7,484,855 B2 * | 2/2009 | Kobayashi | ........... | G03B 21/005 353/122 |
| 7,504,919 B1 * | 3/2009 | Tittle | ...................... | H01H 13/06 335/151 |
| 9,307,129 B2 * | 4/2016 | Oh | ........................... | G06F 1/16 |
| 10,362,211 B1 * | 7/2019 | Ko | .......................... | H04N 5/232 |
| 2012/0033360 A1 * | 2/2012 | Hsu | ....................... | G06F 1/1626 361/679.01 |
| 2014/0028777 A1 * | 1/2014 | Koberling | .............. | H04N 7/142 348/14.01 |
| 2015/0042281 A1 * | 2/2015 | Marze | ................... | H02J 7/0021 320/115 |
| 2019/0278949 A1 * | 9/2019 | Wu | ........................ | H04L 63/102 |
| 2020/0020493 A1 * | 1/2020 | Weaver | ................ | H04N 5/2252 |
| 2020/0319719 A1 * | 10/2020 | Files | ...................... | G08B 21/24 |
| 2021/0081003 A1 * | 3/2021 | Bristol | .................. | H04M 1/236 |

FOREIGN PATENT DOCUMENTS

WO    WO-2019059911 A1 *   3/2019   .......... G06F 1/1679

* cited by examiner

*Primary Examiner* — Clayton E. La Balle
*Assistant Examiner* — Leon W Rhodes, Jr.
(74) *Attorney, Agent, or Firm* — Brian J. Pangrle

(57) ABSTRACT

A device can include a processor; memory; a display; a bezel that defines a bezel region and a display region for the display; one or more media capture components where the one or more media capture components include a camera operatively coupled to the processor, where the camera includes an aperture disposed in the bezel region; a switch that includes an operational state for a circuit electrically coupled to the at least one of the one or more media capture components and a nonoperational state for the circuit; and a movable shutter that controls the switch, where the movable shutter includes a closed orientation that obscures a field of view of the camera and that corresponds to the nonoperational state of the switch and an open orientation that does not obscure the field of view and that corresponds to the operational state of the switch.

20 Claims, 14 Drawing Sheets

COMPUTING DEVICE

TECHNICAL FIELD

Subject matter disclosed herein generally relates to technology for computing or other devices.

BACKGROUND

Various types of devices, display devices, computing and display devices, etc. exist that have one or more cameras for image capture.

SUMMARY

A device can include a processor; memory accessible to the processor; a display operatively coupled to the processor; a bezel that defines a bezel region and a display region for the display; one or more media capture components where the one or more media capture components include a camera operatively coupled to the processor, where the camera includes an aperture disposed in the bezel region that defines a field of view; a switch that includes an operational state for a circuit electrically coupled to the at least one of the one or more media capture components and a nonoperational state for the circuit; and a movable shutter disposed in the bezel region that controls the switch, where the movable shutter includes a closed orientation with respect to the aperture of the camera that obscures the field of view and that corresponds to the nonoperational state of the switch and an open orientation with respect to the aperture of the camera that does not obscure the field of view and that corresponds to the operational state of the switch. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
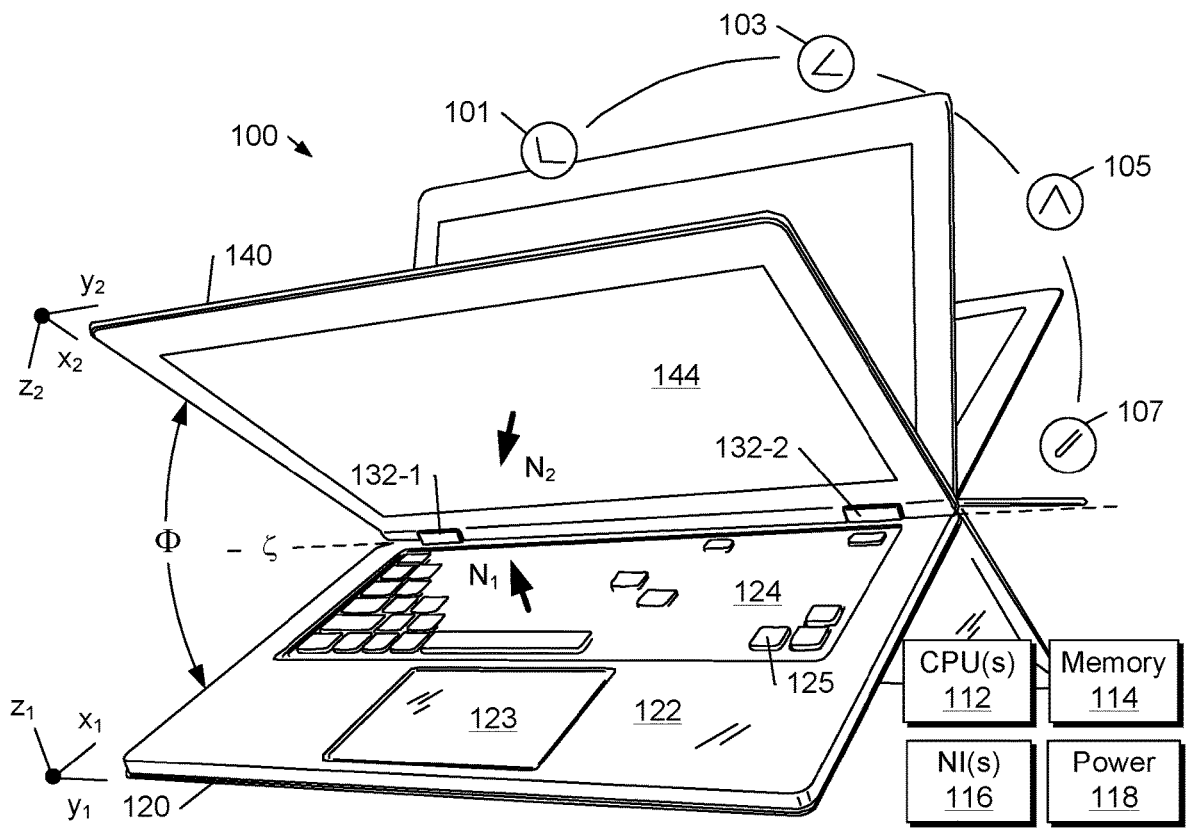
FIG. 1 is a diagram of an example of a device.
Figure 1:
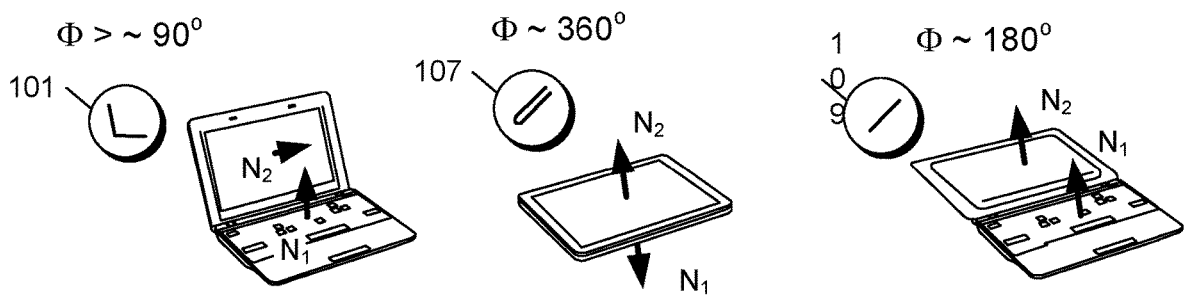

FIG. 1 shows an example of a device 100 that includes a keyboard housing 120 and a display housing 140 that are pivotable with respect to each other via movement about one or more hinges 132-1 and 132-2 (e.g., hinge assemblies). The device 100 may be a device such as, for example, a computing device (e.g., an information handling device).

As an example, the device 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the device 100, the keys 125 may be contacted by the users hand or hands. A user may perceive the springiness of the keys 125 as being somewhat undesirable. For example, springy keys may interfere with a user's ability to comprehend or sense force that is sufficient to grasp the device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis ζ) and then rotate the keyboard housing such that the keys face the back side of the display in a folded orientation. In such an example, a single centrally located hinge provides symmetry such that a computing device can be aligned in a clamshell closed orientation and a tablet orientation, optionally with the keys of the keyboard housing facing the back side of a display of a display housing.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing devices such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
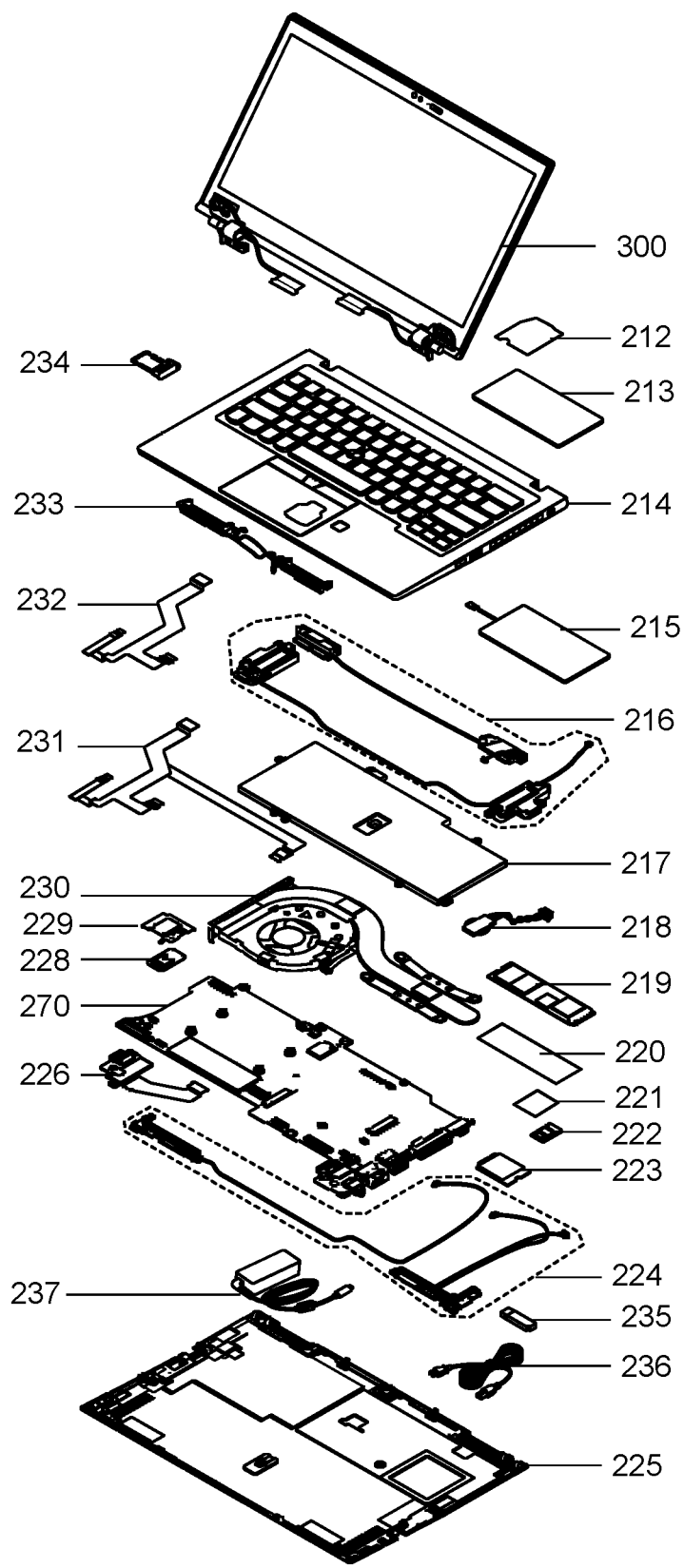
FIG. 2 is a diagram of an example of a device.

FIG. 2 shows an exploded perspective view of a computing device 200 as including various components, which can include, for example, a display assembly 300, insulation trackpad tape 212, a trackpad 213 or 215, a keyboard bezel assembly with keyboard 214, a speaker kit 216, a built-in battery 217, a coin-cell battery 218, a solid-state drive 219, a thermal pad 220, NFC module foam 221, a NFC module 222, a wireless-WAN card 223, a wireless-WAN antenna assembly 224, a base cover assembly 225, a USB and power board 226, a system board 270, a fingerprint reader module 228, a fingerprint reader bracket 229, a thermal fan assembly 230, a trackpad and fingerprint reader cable 231 or 232, a wireless-LAN antenna assembly 233, a SIM-card tray 234, a recovery USB 235, a power cord 236, and an AC power adapter 237.

Figure 3:
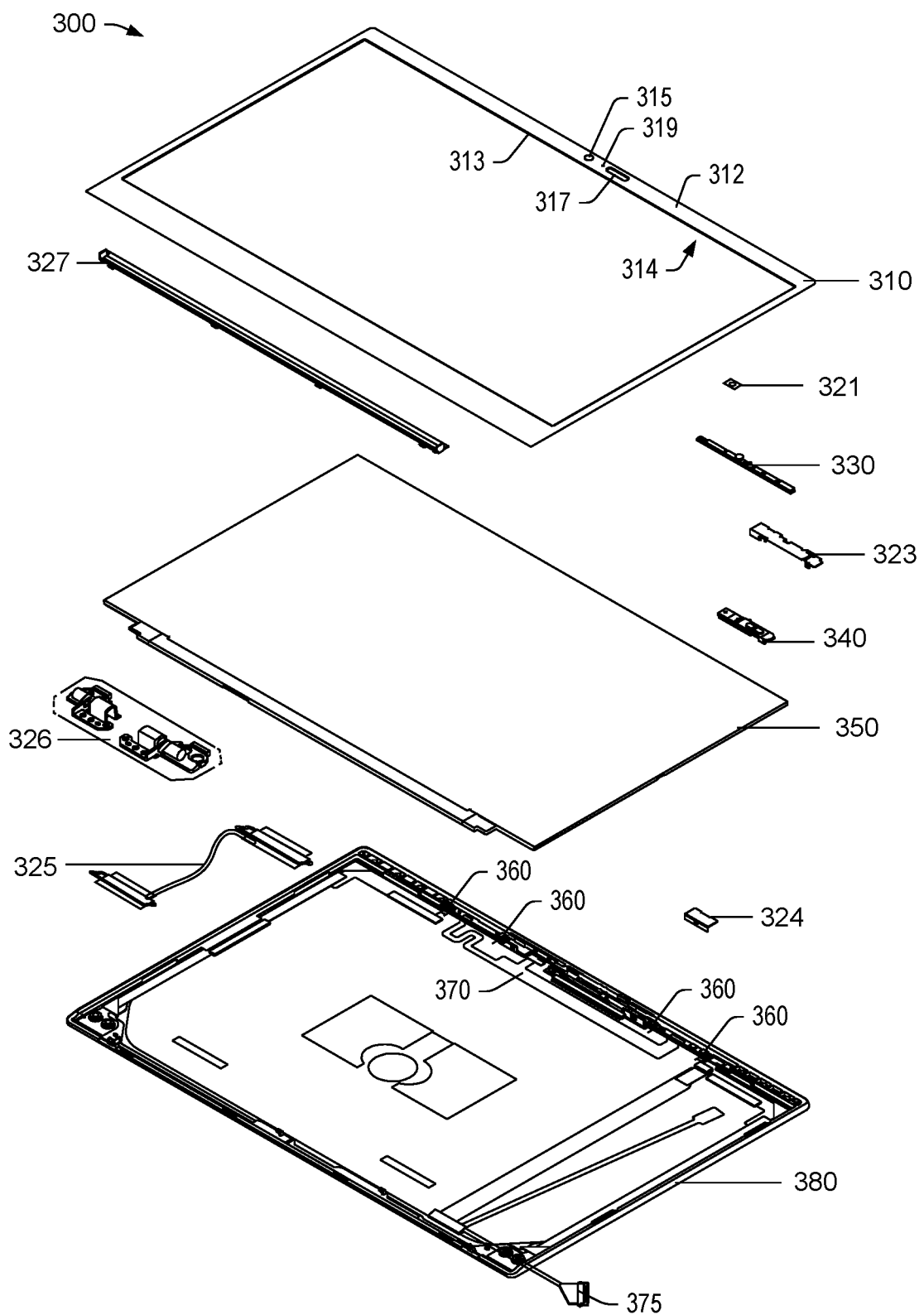
FIG. 3 is a diagram of an example of a display assembly of the device of FIG. 2.

FIG. 3 shows an exploded perspective view of the display assembly 300 of FIG. 2 as including various components, which can include, for example, a bezel 310, a foam component for an IR LED camera 321, a camera module 330, a stopper 323, a shutter 340, a display panel 350, a support plate 324, one or more microphones 360, wiring 370, one or more wiring connectors 375, a back side (rear) cover assembly 380, a display cable 325, hinges 326, and a display bezel frame component 327.

In the example of FIG. 2 and FIG. 3, the computing device 100 can include various media capture components. For example, a camera can be a media capture component, a microphone can be a media capture component, etc. A media capture component may be an audio media capture component, a video media capture component, a still image media capture component, etc.

As shown, the bezel 310 includes a front surface 312 and an opposing rear surface 314 where various openings extend between the front surface 312 and the rear surface 314. For example, as shown, the bezel 310 includes a display opening 313, a camera opening 315, a shutter control opening 317, and an IR camera opening (e.g., where an IR camera is included, noting that a camera may be a combined visible and IR camera).

As shown, the camera module 330 couples to the back side cover assembly 380 where the wiring 370 operatively couples to the camera module 330 and to the one or more microphones 360. The display assembly 300 can be operatively coupled to other circuitry of the computing device 200, for example, via the one or more wiring connectors 375.

Figure 4:
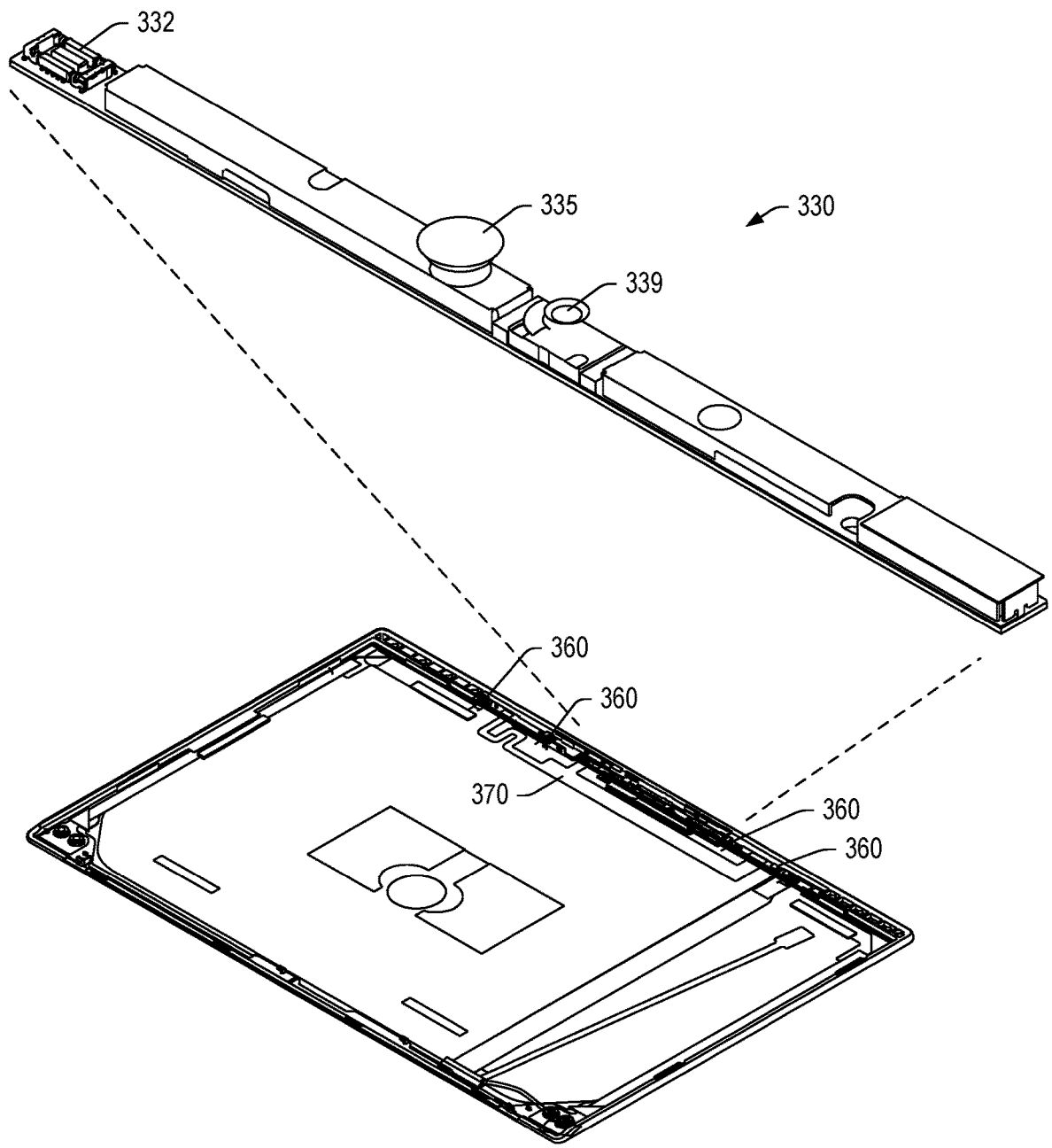
FIG. 4 is a diagram of an example of a camera module of a device.

FIG. 4 shows an enlarged view of the camera module 330 as including a connector 332, a visible camera 335, and an IR camera 339. As explained with respect to FIG. 3, the bezel 310 can include a camera opening 315 and an IR camera opening 319, which can be aligned with the cameras 335 and 339 of the camera module 330.

Figure 5:
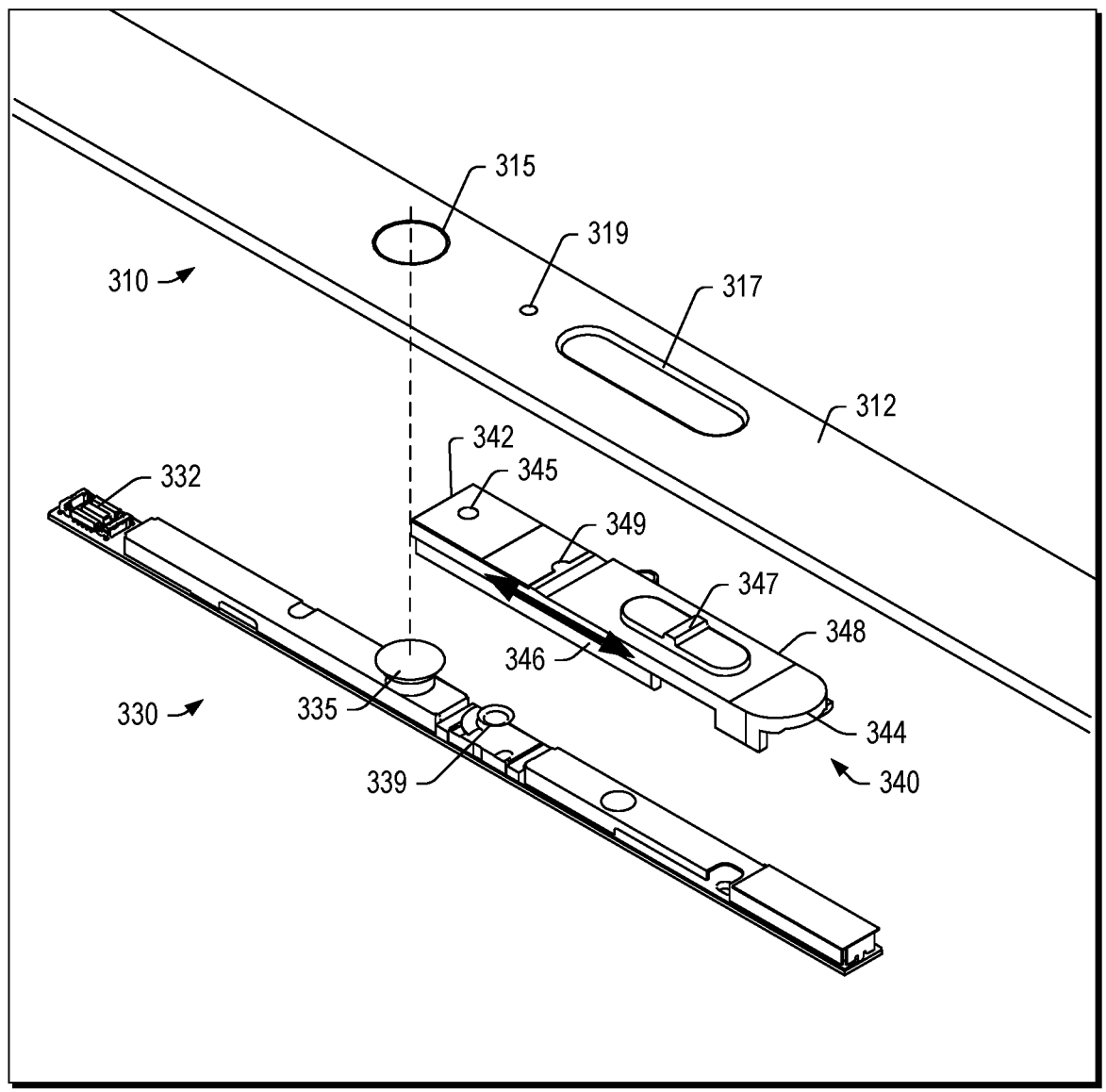
FIG. 5 is a diagram of an example of a movable shutter of a device where the movable shutter is in a first orientation.

FIG. 5 shows an exploded perspective view of the bezel 310, the camera module 330 and the shutter 340 where the shutter 340 is positioned in accordance with an open orientation (e.g., where the shutter 340 is positioned to the right). As shown, the shutter 340 includes opposing ends 342 and 344 where the end 342 is a camera end and the end 344 is a control end. As shown, the shutter 340 includes opposing sides 346 and 348 where the side 346 is an interior side and the side 348 is an edge side (e.g., facing the exterior edge of the bezel 310). As shown, the shutter 340 includes a marker 345, an IR aperture 349, and a grip 347. In the example of FIG. 5, in the open orientation, the marker 345 is not visible via the camera opening 315 (e.g., aperture in the bezel 310) and the camera 335 and the opening 315 are aligned where the grip 347 is positioned toward the rightmost edge of the opening 317. In such an example, the camera 335 has a field of view via the opening 315.

Figure 6:
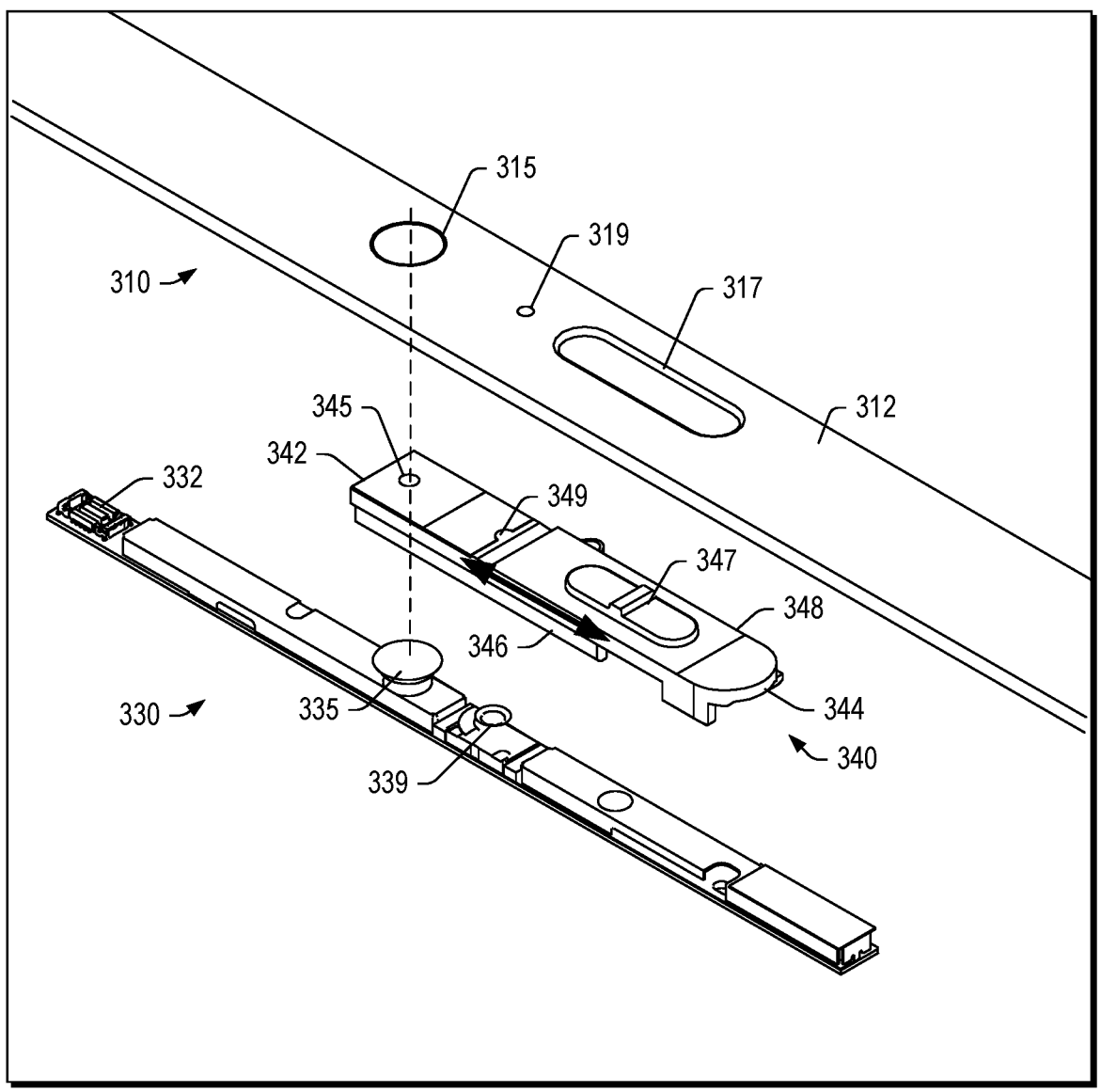
FIG. 6 is a diagram of the example of the movable shutter of a device where the movable shutter is in a second orientation.

FIG. 6 shows an exploded perspective view of the bezel 310, the camera module 330 and the shutter 340 where the shutter 340 is positioned in accordance with a closed orientation (e.g., where the shutter 340 is positioned to the left). In the example of FIG. 6, the marker 345 is aligned with the camera 335 and the opening 315 such that the marker 345 is visible through the opening 315 (e.g., consider a red colored marker, etc.) to indicate that the field of view of the camera 335 via the opening 315 is obscured where the grip 347 is positioned toward the leftmost edge of the opening 317.

As shown in FIG. 5 and FIG. 6, the shutter 340 can be translated from an open orientation (see FIG. 5) to a closed orientation (see FIG. 6) such that the camera 335 is physically blocked from being able to capture a viable image of a scene exterior to the display assembly 300. In the closed orientation, the camera module 330 may remain active as the shutter 340 is a non-electronic component that operates solely as a movable physical barrier to obscure (e.g., block) the field of view of the camera 335.

Figure 7:
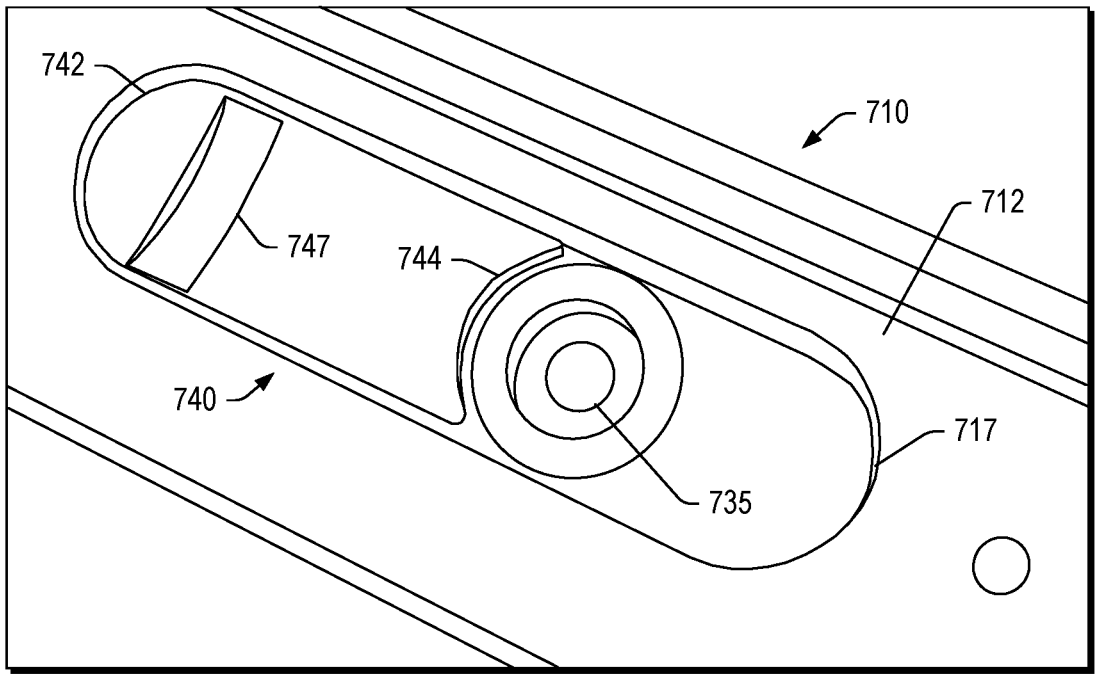
FIG. 7 is a series of diagrams of an example of a movable shutter in two different orientations.
Figure 7:
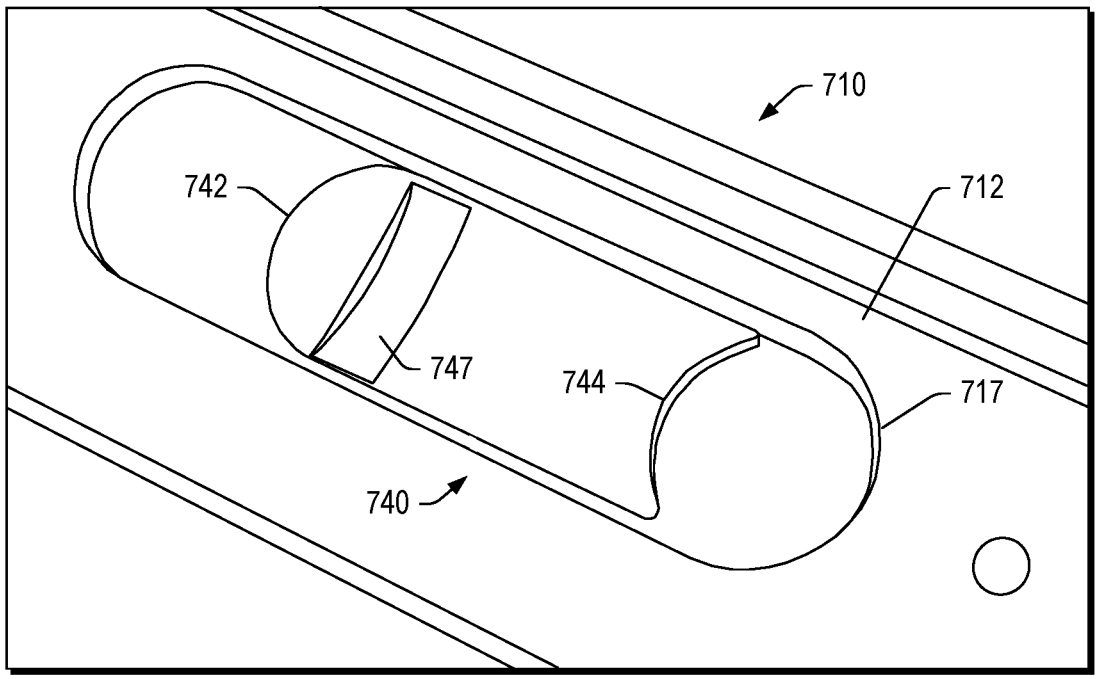

FIG. 7 shows an example of another physical shutter 740 that includes opposing ends 742 and 744 where the shutter 740 can be translated in an opening 717 in a surface 712 of a bezel 710 via a grip 747 to position the shutter 740 in a closed orientation or an open orientation with respect to a camera 735. As shown, the opening 717 can be an opening of a recess where a front surface of the physical shutter 740 may be substantially flush with the surface 712 of the bezel 710. In the example of FIG. 7, the shutter 740 is in an open orientation when in a leftmost position in the opening 717 of the bezel 710; whereas, the shutter 740 is in a closed orientation when in a rightmost position in the opening 717. As an example, a shutter may move right to left or left to right to transition from a closed orientation to an open orientation or vice versa (e.g., depending on the arrangement of components, features, etc.). As an example, a shutter may pivot about an axis, for example, consider a shutter that is rotatable to obscure a field of view of a camera. In such an example, a clockwise rotation may transition the shutter to a closed orientation and a counter-clockwise rotation may transition the shutter to an open orientation or, for example, vice versa. In such an example, a shutter may be shaped as a disk or a portion of a disk.

Figure 8:
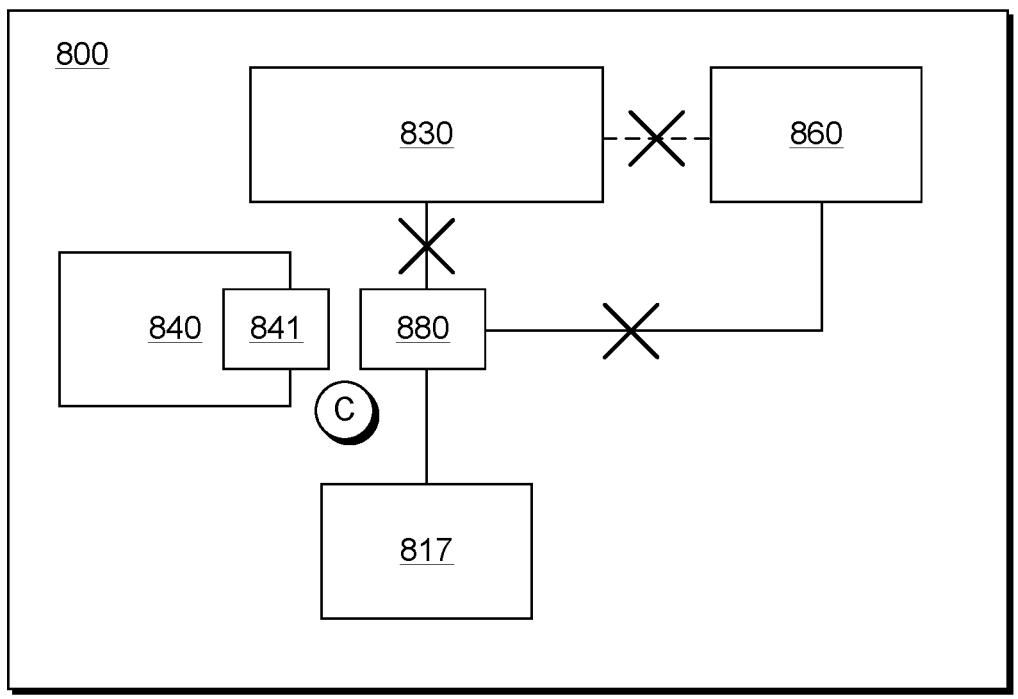
FIG. 8 is a series of diagrams of an example of an assembly in two different states.
Figure 8:
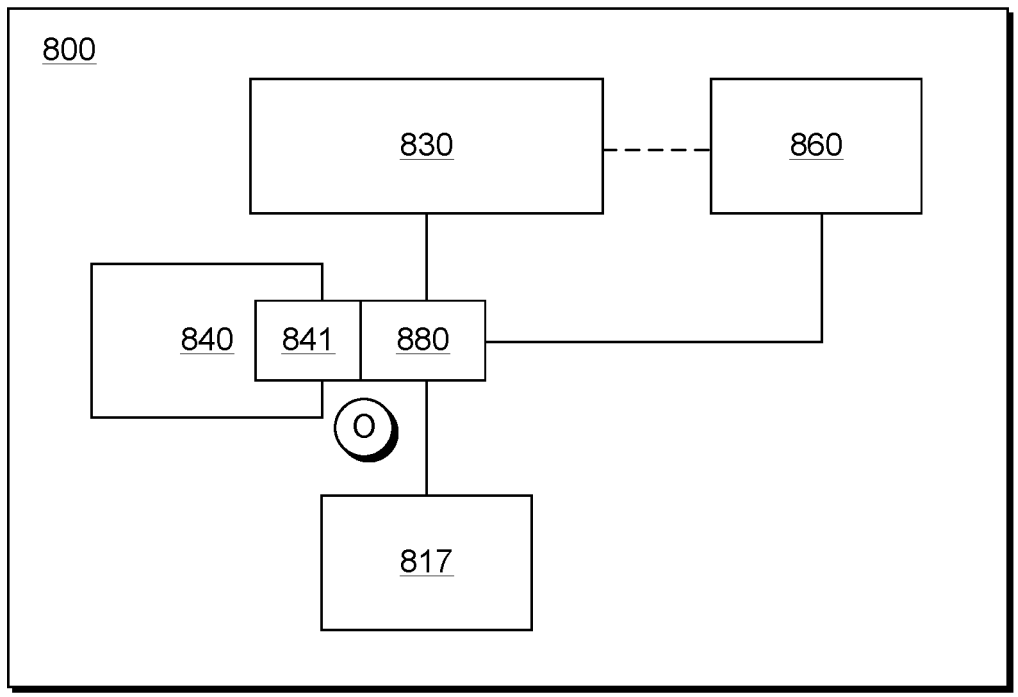

FIG. 8 shows an example of a sub-assembly 800 that includes a power supply 817, a camera 830, a shutter 840, a microphone 860 and a switch 880. In the example of FIG. 8, the camera 830 and the microphone 860 can be media capture components. For example, the camera 830, when operationally powered, can capture visual media and the microphone, when operationally powered, can capture audio media.

As shown, the shutter 840 can include a component 841 such as, for example, a magnet (e.g., a permanent magnet). The power supply 817 can supply the camera 830 and/or the microphone 860 with power depending on the state of the switch 880, which can include an on-state and an off-state. In the example of FIG. 8, the on-state can correspond to a position of the shutter 840 and the component 841 and the off-state can correspond to another, different position of the shutter 840 and the component 841. For example, consider the shutter 340 of FIG. 5 and FIG. 6 or the shutter 740 of FIG. 7 where the shutter 340 can include a magnet or where the shutter 740 can include a magnet such that movement of the shutter 340 or the shutter 740 moves a magnet that can transition a switch from an on-state to an off-state where the on-state corresponds to an open orientation of the shutter 340 or the shutter 740 and where the off-state corresponds to a closed orientation of the shutter 340 or the shutter 740. In such an approach, a field of view of a camera (e.g., a field of view through a lens of the camera) can be obscured physically by a shutter in a closed orientation and the camera can be decoupled from a source of power when the shutter is in the closed orientation, which corresponds to an off-state of a switch that cuts the supply of power to the camera. As an example, a switch may electrically control power and/or signal such as, for example, a data signal.

As shown in FIG. 8, supply of power to one or more microphones may be cut via the switch (e.g., or another switch switchable via position of a magnet, etc.). Such an approach to control of microphone power may be alternative to or additional to control of camera power.

As to the switch 880, it may be operatively coupled to a connector, connectors, wiring, etc. For example, consider the wiring 370 as shown in FIG. 3 as include a power wire or power wires that can be interrupted via the switch 880 in response to positioning of the shutter 340.

As an example, a shutter can be a multi-position shutter (e.g., multi-state shutter) that includes more than two positions. For example, consider a muting position that can cut power to a microphone while still allowing a camera to be operationally powered. As an example, a position can be for cutting power to a camera while still allowing a microphone to be operationally powered. As an example, a position can be for cutting power to a camera and a microphone. As an example, a position can be for cutting one or more of power and signal to a camera and/or a microphone.

As an example, a shutter can include three positions: microphone and camera usable (e.g., operational), camera unusable (e.g., nonoperational) and microphone usable, and camera and microphone unusable. As an example, a shutter can include three positions: microphone unusable and camera usable, microphone and camera usable, and at least camera unusable. As an example, a shutter can include more than three positions.

TABLE 1

Example Shutter Positions

| Position | Condition |
|---|---|
| −1 | C usable & M unusable |
| 0 | C & M usable |
| +1 | C unusable |
| +2 | C & M unusable |

Table 1 shows an example of four shutter positions with respect to a zero or null position. As shown, the shutter can include a position that is in one direction away from the null position and one or more positions that are in a different, opposing direction away from the null position. For example, consider the shutter as being a mute switch where a user can move the shutter in a direction that does not block a camera to mute a microphone or microphones. Where the user desires blocking the camera, there can be a first position that is in an opposite direction that causes the shutter to block the camera, which may or may not cut camera power and/or signal and, for example, there can be a second position that is beyond the first position that blocks the camera and mutes the microphone, which may or may not cut camera power and/or signal. As an example, a usable state can be an operational state and an unusable state (or not usable state) can be a nonoperational state. As an example, a usable state can be an operational state that includes power and signal and, for example, an unusable state can be a nonoperational state due to lack of power and/or lack of signal (e.g., from a media capture component, etc.).

Figure 9:
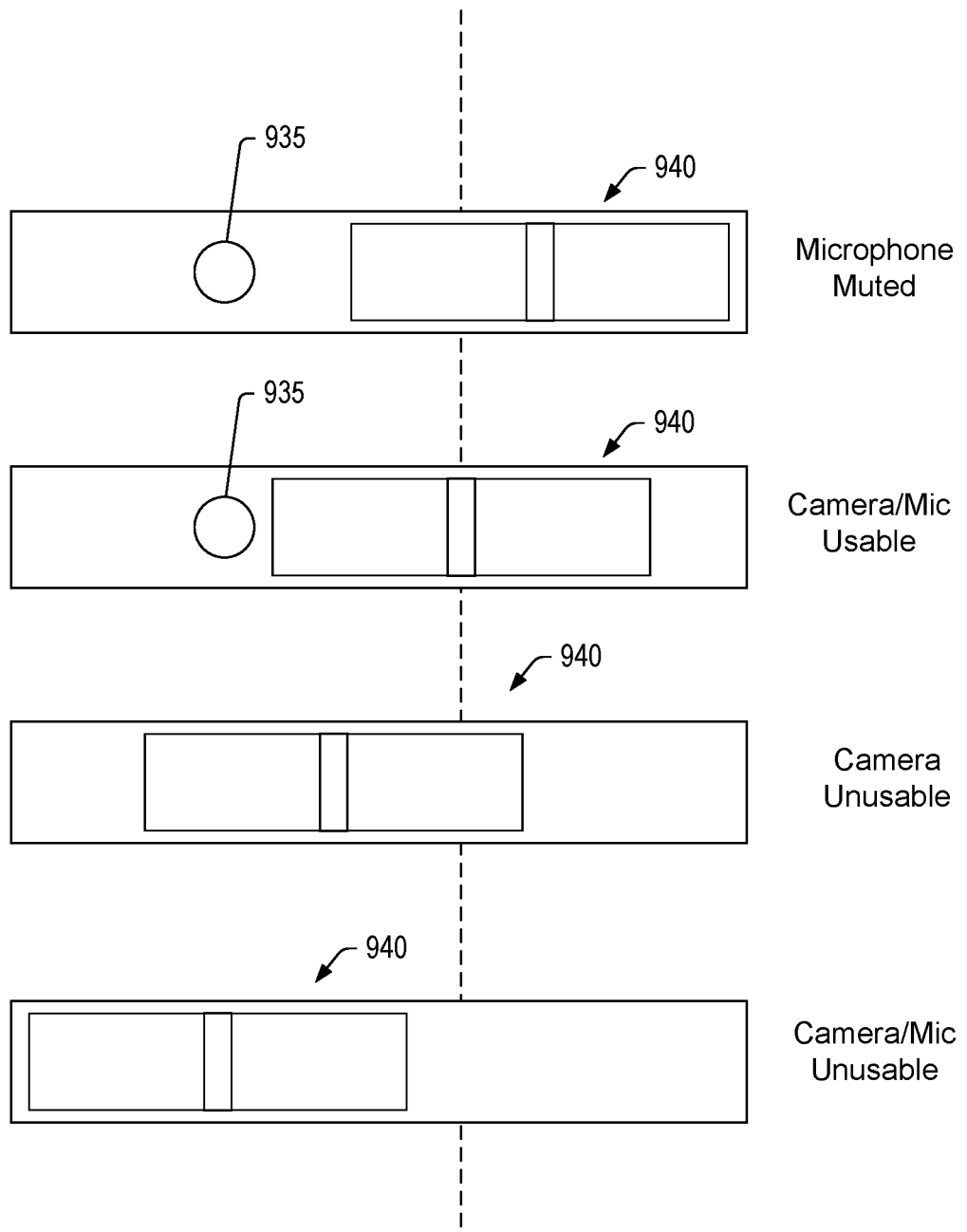
FIG. 9 is a series of diagrams of a shutter in different positions as associated with different conditions of one or more media capture components.

FIG. 9 shows an example of a shutter 940 with respect to a camera 935 where the shutter 940 can include two or more positions, which can include, for example, the four positions shown. As shown, the positions can correspond to the positions and conditions in Table 1.

As an example, a switch can be a single-pole, single throw (SPST) switch, which may be a type of reed switch. As an example, such a switch may be normally in an off-state (e.g., an open circuit state) or normally in an on-state (e.g., a closed circuit state). The example of FIG. 8 shows the switch 880 as being normally in a closed state (e.g., an open circuit state) where the component 841, which can be a magnet, can be positioned proximate to the switch 880 such a field of the component 841 (e.g., a magnetic field) causes the switch 880 to transition its state from an off-state to an on-state. In such examples, the off-state can be a nonoperational state and the on-state can be an operational state.

As an example, an off-state may be an electrically shorted stated that is a nonoperational state. As an example, an electrically shorted state may be a state where a circuit is electrically shorted to ground (e.g., a ground fault state).

As an example, a switch can be a MEMS-based reed switch, which may be a SPST device that is normally open with, for example, ruthenium contacts. In such an example, the switch may be actuated by an electromagnet, a permanent magnet, or a combination of both. A white paper entitled "MEMS-Based Magnetic Reed Switch Technology" (rev. 130417, Coto Technology, North Kingstown, R.I., 2013) is incorporated by reference herein.

As an example, a switch can be of relatively small dimensions and can operate without supply of electricity (e.g., without current from a power supply, etc.).

As an example, a switch can be a reed switch that is operated by an applied magnetic field. Such a switch can include, for example, a pair of ferromagnetic flexible metal reeds that can contact in a hermetically sealed envelope (e.g., glass, etc.). Such a switch can include contacting parts that are normally open, closing when a magnetic field is present; or, for example, contacting parts may be normally closed and open when a magnetic field is applied. As an example, a switch may be actuated by an electromagnetic coil, making a reed relay, or by bringing a permanent magnet near the switch. When the magnetic field is removed (or sufficiently reduced), the reed (or reeds) in the reed switch can return to its (or their) original position(s). As an example, a reed can be an electrically conductive part inside a reed switch envelope that is relatively thin and wide to make it flexible.

As an example, a switch may be normally open (NO) or a switch may be normally closed (NC). As an example, a magnet may be fixed to a reed switch to change its state from one of being normally closed to one of being normally open or vice versa where, for example, another magnet can be utilized for switching (e.g., with a magnetic field of an opposite polarity of the fixed magnet) where that other magnet provides a field that can sufficiently cancel out the field of the fixed magnet.

Figure 10:
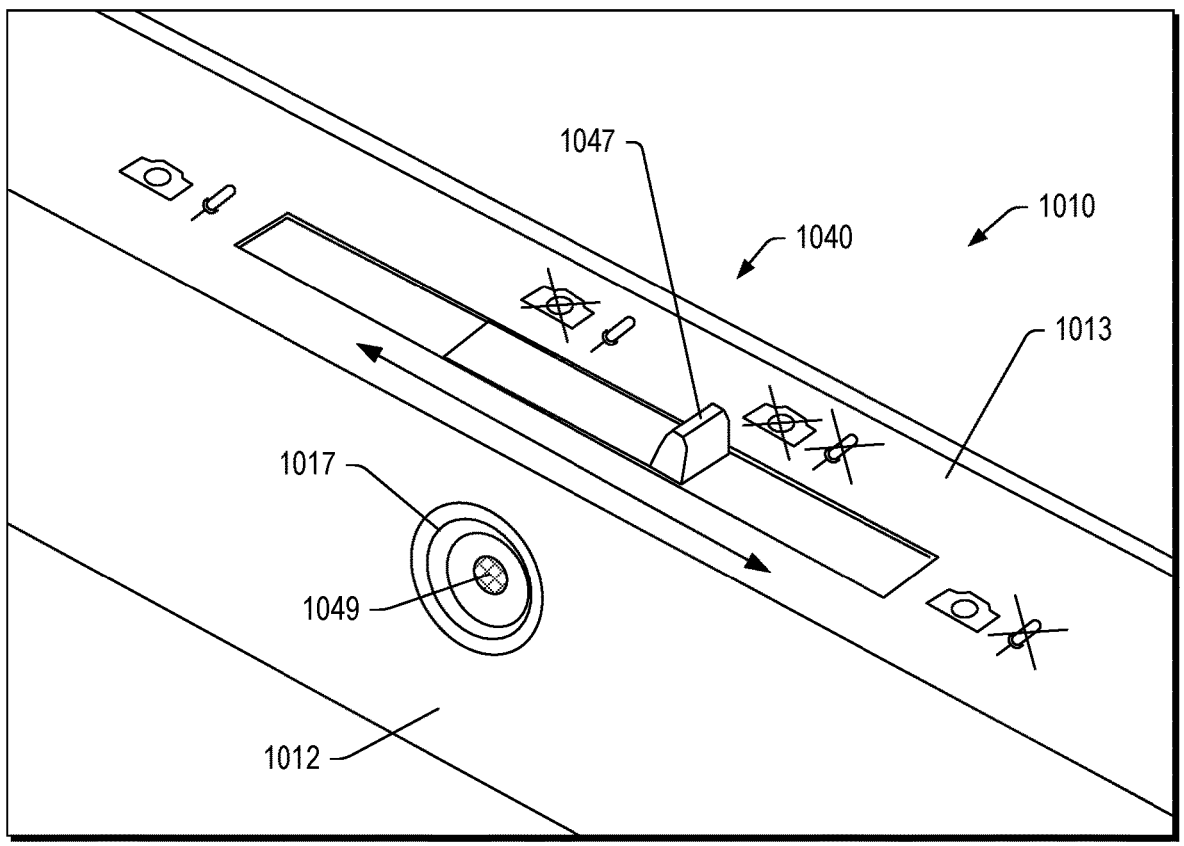
FIG. 10 is a diagram of an example of a movable shutter of a device.

FIG. 10 shows an example of a bezel 1010 that defines a bezel region and a display region for a display of a device where the device includes one or more media capture components (e.g., a camera, cameras, a microphone, microphones, etc.). As shown, the bezel 1010 can include one or more surfaces 1012 and 1013 where at least one of the surfaces 1012 and 1013 can include an opening 1017 that can be an aperture disposed in the bezel region that defines a field of view for a camera. In the example of FIG. 10, the surface 1012 may be a front facing surface while the surface 1013 may be at an angle to that surface such that it is an upper surface (e.g., an edge surface, etc.). As an example, the surface 1013 may be approximately 90 degrees to the surface 1012 such that a corner is formed between the two surfaces 1012 and 1013. As an example, a bezel can be at least in part front facing. As an example, a bezel can be at least in part edge facing. As an example, an aperture may be covered by glass and/or other translucent material where a movable shutter may be utilized to physically cover the aperture to obscure a field of view of a camera via the aperture.

As shown in the example of FIG. 10, a movable shutter 1040 can be movable (e.g., via a grip 1047) to operate a power switch operatively coupled to at least one of the one or more media capture components, where the power switch can include an on-state that supplies operational power to the at least one of the one or more media capture components and an off-state that does not supply operational power to the at least one of the one or more media capture component. In such an example, the movable shutter 1040 disposed in the bezel region of the bezel 1010 can control the power switch where the movable shutter 1040 can include a closed orientation with respect to the opening 1017 that corresponds to the off-state of the power switch and an open orientation with respect to the opening 1017 that corresponds to the on-state of the power switch. In the example of FIG. 10, markings are illustrated for a camera and a microphone that represent various conditions (see, e.g., Table 1). For example, from left to right, the conditions can include camera and microphone usable, camera not usable and microphone usable, camera and microphone not usable, and camera usable and microphone not usable. In such examples, the camera not usable can be due to its field of view being obscured, power being effectively cut and/or signals being effectively cut. In such examples, the microphone not usable can be due to its transducer being acoustically obscured, power being effectively cut and/or signals being effectively cut. As an example, markings (e.g., indicia) may be on one or more surfaces, such as, for example, on the surface 1012 and/or on the surface 1013.

In the example of FIG. 10, the movable shutter 1040 can include or be operatively coupled to a component 1049 that can obscure the field of view of a camera. In such an example, the component 1049 can be an opaque component and/or other type of component that obscures radiation from forming a viable image (e.g., multifaceted material, a light scattering material, a screen, etc.). As an example, where a microphone is a media capture component, a bezel can include an opening that can receive sound waves (compression waves, etc.). As an example, a movable shutter can include or be operatively coupled to a component that can close such an opening and/or cover a transducer portion of a microphone. For example, such a component may be made of a sound absorbing (e.g., a sound deadening material) that can reduce (e.g., damp) acoustic energy. As an example, such a material can be polymeric such as a polymeric foam, a polymeric gel, etc.

Figure 11:
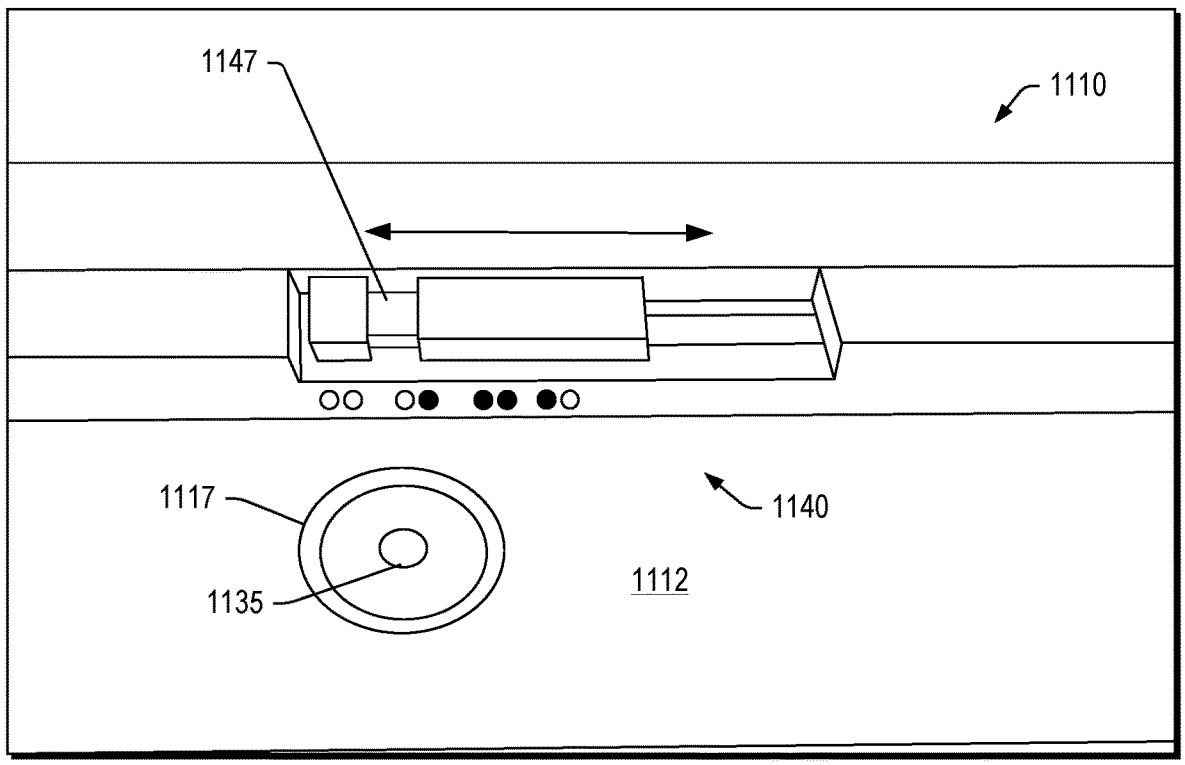
FIG. 11 is a diagram of an example of a movable shutter of a device.

FIG. 11 shows an example of a bezel 1110 that defines a bezel region and a display region for a display of a device where the device includes one or more media capture components (e.g., a camera, cameras, a microphone, microphones, etc.). As shown, the bezel 1110 can include a surface 1112 with an opening 1117 that can be an aperture disposed in the bezel region that defines a field of view for a camera 1135. As shown, a movable shutter 1140 can be movable (e.g., via a grip 1147) to operate a power switch operatively coupled to at least one of the one or more media capture components, where the power switch can include an on-state that supplies operational power to the at least one of the one or more media capture components and an off-state that does not supply operational power to the at least one of the one or more media capture component. In such an example, the movable shutter 1140 disposed in the bezel region of the bezel 1110 can control the power switch where the movable shutter 1140 can include a closed orientation with respect to the opening 1117 that corresponds to the off-state of the power switch and an open orientation with respect to the opening 1117 that corresponds to the on-state of the power switch. In the example of FIG. 11, markings are illustrated that can represent various conditions (see, e.g., Table 1). For example, from left to right, the conditions can include camera and microphone usable, camera not usable and microphone usable, camera and microphone not usable, and camera usable and microphone not usable. In such examples, the camera not usable can be due to its field of view being obscured, power being effectively cut and/or signals being effectively cut. In such examples, the microphone not usable can be due to its transducer being acoustically obscured, power being effectively cut and/or signals being effectively cut.

As explained, a movable shutter can include or be operatively coupled to a component that can obscure the field of view of a camera and/or can include or be operatively coupled to a component that can close an opening and/or cover a transducer portion of a microphone. For example, such a component may be made of a sound absorbing (e.g., a sound deadening material) that can reduce (e.g., damp) acoustic energy. As an example, such a material can be or include a polymeric material such as a polymeric foam, a polymeric gel, etc. As an example, a component may be configured to obscure radiation, which may be electromagnetic radiation (e.g., light waves) and/or acoustic radiation (e.g., sound waves). As an example, a movable shutter may be formed from a material as a piece that includes one or more portions that can obscure a field of view of a camera. In such an example, the movable shutter can be magnetic and/or include one or more magnets.

As an example, one or more magnets may be formed integrally with a movable shutter (e.g., consider molding a polymeric material with a magnet). As an example, a magnet may be fully encapsulated by a material such that debris is not able to directly contact the magnet. In such an example, the material may be wiped to clean away any debris (e.g., ferromagnetic debris). As an example, a device may include a cleaning component that can act to wipe away any debris that may become attracted to a magnet or magnets. For example, consider a brush, a felt, etc., that can sweep away debris when a movable shutter is moved from one position to another position. In such an example, a magnet may be less likely to accumulate debris over time, which may, if not cleared away, hinder movement (e.g., increase friction, etc.). As an example, a movable shutter may be made from an electrical insulator such that the movable shutter does not conduct electricity. As an example, a movable shutter can include a magnet where the magnet may be encapsulated and/or otherwise insulated by an electrical insulator.

Figure 12:
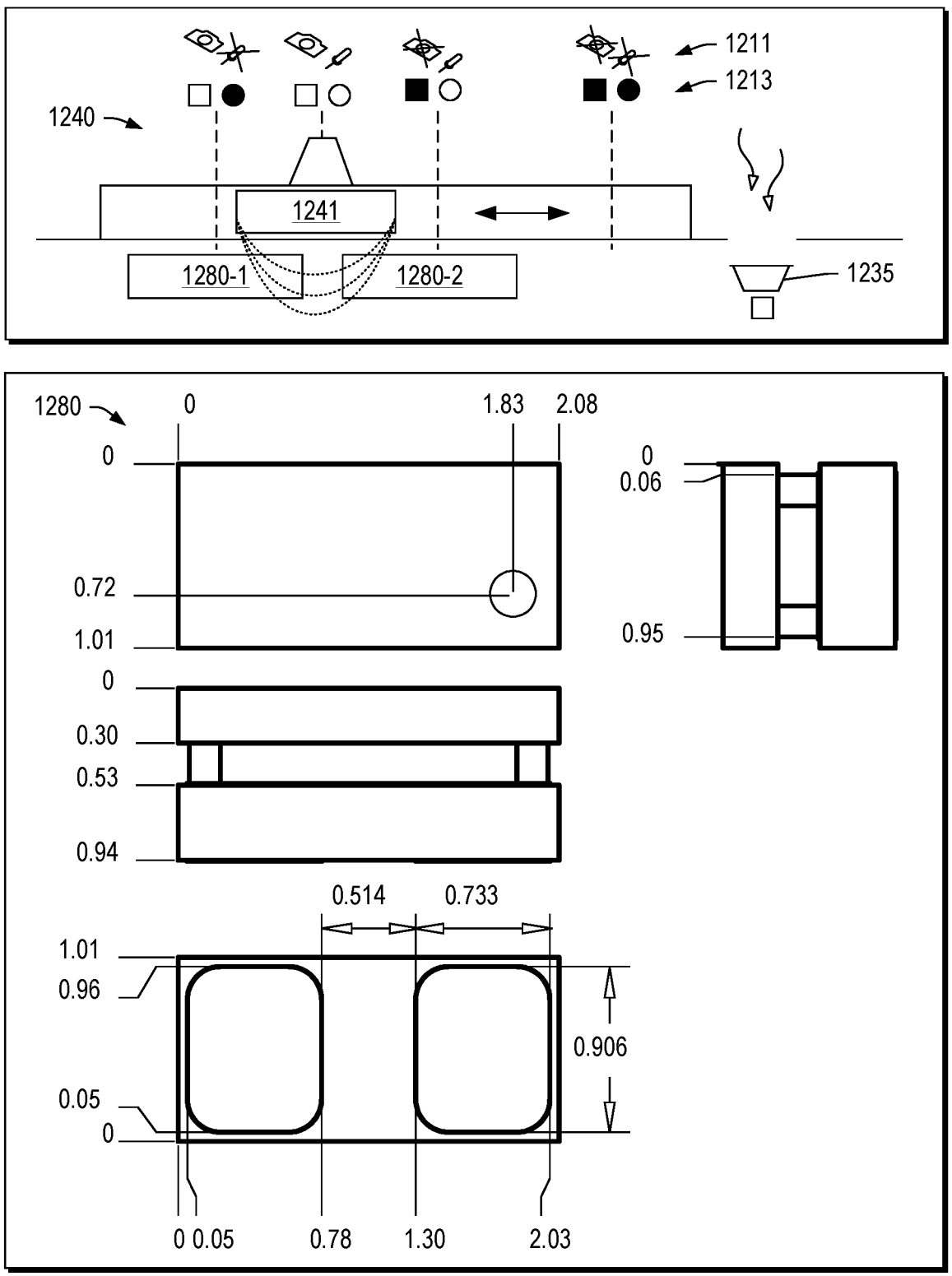
FIG. 12 is a diagram of an example of a movable shutter of a device and a diagram of an example of a switch.

FIG. 12 shows an example of a portion of a device that can include bezel indicia 1211 and/or 1213, a camera 1235, a movable shutter 1240 that can include a magnet 1241, and one or more switches 1280-1 and 1280-2 along with various views of an example of a switch 1280. In the example of FIG. 12, the dimensions of the switch 1280 are given in millimeters. As shown, the switch 1280 can be relatively small having a largest dimension of approximately 2 mm (e.g., 2.08 mm). As an example, a switch can be relatively small with dimensions that can be less than 20 mm, less than 10 mm or less than 5 mm. As an example, a movable shutter can be relatively small, for example, consider a camera with a lens that may have an outer diameter of approximately 20 mm or less where a portion of the movable shutter may be slightly larger than the outer diameter. In the examples of FIG. 5 and FIG. 6, the shutter 340 may be approximately 30 mm from end to end and approximately 10 mm or less from side to side, where the side to side dimension is sufficient to cover the camera 335 (e.g., obscure the field of view of the camera 335) in a closed orientation (see FIG. 6).

As to the bezel indicia 1211 and/or 1213 (e.g., markings), these may indicate one or more types of media capture components (e.g., a camera, a microphone, etc.). As shown, the bezel indicia 1211 and/or 1213 can indicate when a media capture component is usable or not useable (e.g., unusable). As mentioned, an unusable state (e.g., a nonoperational state) can be due to one or more types of electrical lines being in a switched off state; whereas, a usable state (e.g., an operational state) can be due to one or more types of electrical lines being in a switched on state.

In the example of FIG. 12, the switches 1280-1 and 1280-2 are "on" in the presence of a magnet field of the magnet 1241, which can be part of or operatively coupled to the movable shutter 1240. As shown, where the two media capture components are usable, the magnet 1241, which may be more than one magnet, causes the switches 1280-1 and 1280-2 to be "on". Movement of the movable shutter 1240 to the left, moves the magnetic field of the magnet 1241 a distance away from the switch 1280-2 such that the switch 1280-2 transitions to an off state while the switch 1280-1 remains in an on state; whereas, movement of the movable shutter 1240 to the right by a first distance moves the magnet 1241 a distance away from the switch 1280-1 such that the switch 1280-1 transitions to an off state while the switch 1280-2 remains in an on state and further the movable shutter 1240 causes a field of view of the camera 1235 to be obscured (e.g., by covering an aperture, etc.). Further, as shown in the example of FIG. 12, movement of the movable shutter 1240 to the right by a second distance moves the magnet 1241 a distance away from the switch 1280-2 such that the switch 1280-2 transitions to an off state while the switch 1280-1 remains in the off state and further where the movable shutter 1240 still causes a field of view of the camera 1235 to be obscured (e.g., by covering an aperture, etc.).

While the example of FIG. 12 pertains to a scenario where multiple switches are "on" in the presence of a magnetic field of a magnet and off where a magnetic field of a magnet is too weak and/or not sufficiently aligned, other scenarios may be utilized. For example, a switch may be "off" in the presence of a magnetic field of a magnet. As an example, a switch may be configured to respond to a magnetic field below and/or above a magnetic field strength (e.g., in mT), which can be that of a magnet or magnets, and/or, as an example, a switch may be configured to respond to a magnetic field orientation, which can be that of a magnet or magnets. As an example, a scenario may utilize a fixed magnet or magnets and a movable switch or switches and/or a fixed switch or switches and a movable magnet or magnets.

As an example, a movable switch may be part of a movable shutter that can move with respect to a magnet. As an example, a switch may be carried by a movable shutter where a magnet or electromagnet may be stationary. In such an example, the switch may be moved by positioning of the movable shutter to cause the switch to be proximate to the magnet or not such that the switch transitions from on to off or off to on.

Figure 13:
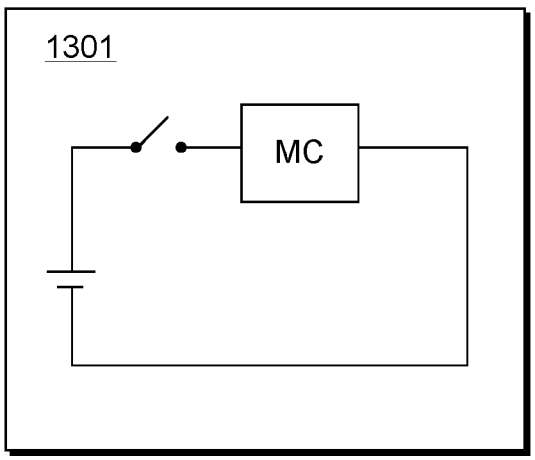
FIG. 13 is a series of diagrams of examples of states of circuitry.
Figure 13:
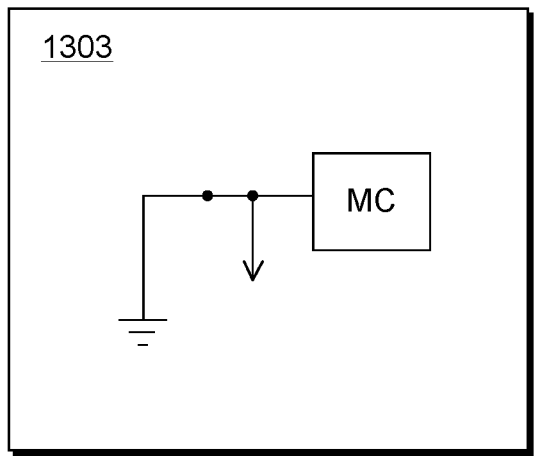
Figure 13:
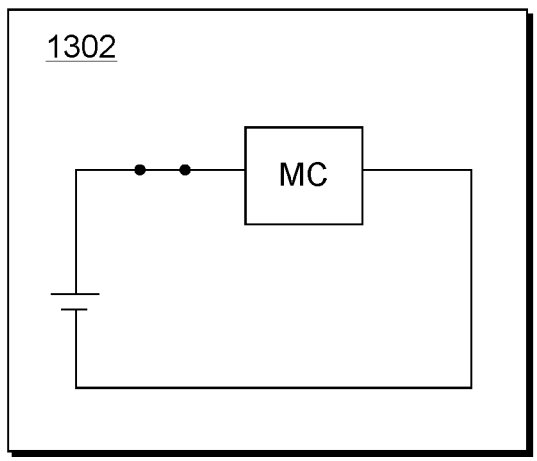
Figure 13:
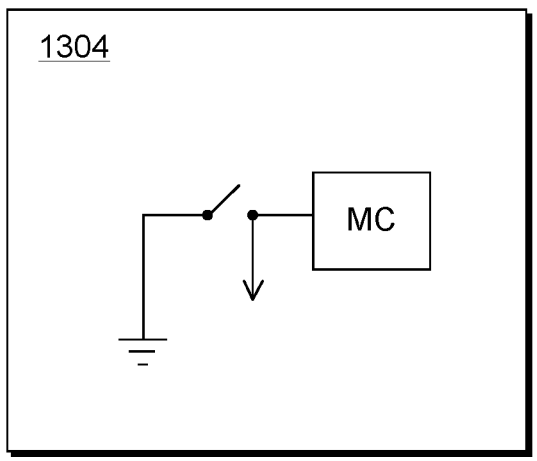

FIG. 13 shows example states of circuitry 1301 and 1302 and example states of circuitry 1303 and 1304. In each of the example states 1301, 1302, 1303 and 1304, the circuitry includes a switch, which can be transitioned between an open and a closed position. In such examples, each of the switches may be controllable using a movable shutter.

In the example state 1301, power is cut off to a media capture component (MC) as the switch is open. In the example state 1303, a circuit pathway of a media capture component (MC) is shorted to ground as the switch is closed and electrically coupled to ground. In the example state 1302, power is supplied to the media capture component (MC) as the switch is closed. In the example state 1304, the circuit pathway of the media capture component (MC) is not shorted to ground as the switch is open.

As mentioned, an off-state may be an electrically shorted stated that is a nonoperational state (e.g., where one or more media capture components are not usable). As an example, an electrically shorted state may be a state where a circuit is electrically shorted to ground (e.g., a ground fault state). As an example, electrical shorting can occur where a low resistance electrical pathway is provided, which may be provided via a switch (e.g., a switch that couples to a conductor to ground, etc.).

One or more of the approaches illustrated in FIG. 13 may be utilized to control one or more electrical lines, which may be for electrical power and/or electrical signals. As an example, a switch may be normally on (e.g., closed) or a switch may be normally off (e.g., open). As explained, one or more media capture components can be controlled using one or more types of switches that are switchable using a movable shutter.

As an example, a switch can include an operational state for a circuit electrically coupled to the at least one of one or more media capture components and can include a nonoperational state for the circuit. For example, in FIG. 13, the states 1301 and 1303 can be nonoperational states and the states 1302 and 1304 can be operational states. As an example, a device can include a movable shutter disposed in a bezel region that controls a switch, where the movable shutter has a closed orientation with respect to an aperture of a camera that obscures a field of view of the camera and that corresponds to a nonoperational state of the switch (see, e.g., the states 1301 and 1303) and an open orientation with respect to the aperture of the camera that does not obscure the field of view and that corresponds to the operational state of the switch (see, e.g., the states 1302 and 1304).

As an example, a switch can utilize a Hall sensor (e.g., a Hall effect sensor) and/or a magnetoresistive sensor. As an example, a Hall Effect sensor can be a type of sensor that can respond to a magnetic field oriented perpendicular to the sensor. As an example, a magnetoresistive sensor can be a type of sensor that can respond to a magnetic field oriented parallel to the sensor. As an example, a sensor may be a hybrid sensor or other type of magnetic field sensor.

As an example, a sensor can measure magnitude of a magnetic field where its output voltage is directly proportional to magnetic field strength. As an example, a switch can utilize a sensor and a threshold detector where the threshold detector changes state in response to voltage output by the sensor.

Information security may be referred to as InfoSec or INFOSEC. INFOSEC can include one or more processes and/or tools designed and deployed to protect sensitive information from modification, disruption, destruction, and inspection. As an example, a movable shutter can be utilized to prevent acquisition of information by one or more media capture components (e.g., a camera, a microphone, associated circuitry, etc.). Such a movable shutter may be an INFOSEC tool that can be selectively utilized as part of one or more INFOSEC processes.

INFOSEC can be concerned with media capture components that can be hijacked. For example, a webcam hacker may hijack a webcam of a device by installing and utilizing remote-control malware. A process known as camfecting refers to a hacked or hijacked camera, which may be a webcam. Various cameras may include one or more associated microphones. For example, a webcam may include one or more camera and one or more microphones. As an example, a hacker may aim to hack or hijack, directly or indirectly, one or more cameras and/or one or more microphones. As an example, a movable shutter can be an INFOSEC tool that can selectively prevent use of at least one camera and/or at least one microphone even if a device has been hacked. Such a movable shutter can prevent use when a user does not intend to use one or more media capture devices. As explained, a movable shutter can, for example, for a camera, provide two different mechanisms that make the camera selectably unusable, one mechanism being to obscure a field of view of the camera and another mechanism being to cut one or more electrical signals (e.g., power, data, etc.). As an example, a camera that has an associated microphone (e.g., as part of a unit, a module, etc.) may be usable when the camera is unusable, for example, by cutting one or more electrical signals. As an example, a movable shutter may be a multi-state shutter for more than one media capture component (see, e.g., the examples of FIG. 9, FIG. 10, FIG. 11, FIG. 12, etc.) where a state table may specify conditions for the media capture components with respect to the multi-state shutter.

As an example, a movable shutter can be at least in part a built-in physical privacy guard that can prevent snooping via one or more media capture components.

As an example, a media capture component can be a microphone array, which may be disabled using a movable shutter. In such an example, a device can include a physical on/off switch, which may operate using presence/absence of a magnetic field and/or magnetic fields of a magnet or magnets (e.g., where presence/absence may be with respect to strength and/or alignment of the magnetic field or magnetic fields).

As an example, a device can include a magnetically coupled switching mechanism to disable an onboard device camera and microphone array, for example, to make the device selectably immune to one or more types of cyberattack vectors.

As an example, a switch can be a reed/Herkon switch and a source of a magnetic field can be a magnet. As an example, a reed/Herkon switch can be an electrical switch (e.g., normally open) that can be operated by an applied magnetic field. Such a switch can include a pair (e.g., or more) of magnetizable, flexible, metal reeds whose end portions are separated by a small gap when the switch is open. In such an example, the reeds can be hermetically sealed in opposing ends of the switch (e.g., a hermetically sealed switch body). In such an example, a magnetic field (e.g., of a permanent magnet) can cause the reeds to attract each other, thus completing an electrical circuit (e.g., transitioning the switch from open to closed, where closed can be an "on" state).

As an example, a method can be selectable to disable a camera and microphone array with a magnetically coupled mechanism (e.g., one or more permanent magnets, etc.) that can cause reeds of a reed switch to attract each other, thus completing an electrical circuit. In such an example, the reeds can be configured in a switch body to have a spring force that causes them to separate and open the circuit when the attraction force is less than the spring force (e.g., when a magnetic field decreases below a particular level, changes in its orientation, etc.).

As an example, a device can include a sliding camera cover with a magnet part (see, e.g., FIG. 12) where, in such an example, when the camera is uncovered, the magnet part is over a reed switch (e.g., oriented proximate to for purposes of activation), the switch turns on and a circuit is complete; vice versa, when camera cover slides to block the camera's field of view, the magnet part moves away from the reed switch such that the switch turns off and the circuit is incomplete. In such an example, the switch can be used to power on or off a camera and/or microphone array or, for example, be used to pull output signals/voltage of the camera and mic to ground (see, e.g., FIG. 13).

As an example, a movable shutter can include a magnet that can be positioned over a reed switch to complete a circuit such that a camera and a microphone (e.g., or microphone array) are "on" where, when the magnet is not over the reed switch, the circuit is not complete such that the camera and the microphone (e.g., or the microphone array) are "off". As an example, a movable shutter can obscure a field of view of a camera when a magnet is not over a reed switch such that a circuit is not complete. In such an example, the movable shutter may have various states, which may include obscure field of view with circuit incomplete, obscure field of view with circuit complete, etc. For example, consider a first state that moves a cover over an aperture while a magnetic field of a magnet is proximate to a reed switch such that a circuit is complete and a second state that maintains the cover over the aperture while positioning the magnet a distance from the reed switch such that the circuit is incomplete (e.g., open). In such an example, the second state may be considered a more secure state (e.g., for purposes of INFOSEC, etc.).

As an example, a movable shutter can be a physical device that can utilize a magnetic field or magnetic fields to transition one or more switches. In such an example, operation of the movable shutter and associated functions as to transitioning of switches can be decoupled from a CPU, a baseboard management controller (BMC), a GPU, a boot environment and/or an operating system (OS) environment of a computing device. As an example, a movable shutter can be a physical device that is not controlled by execution of instructions stored in a computer-readable storage medium (e.g., a drive, etc.). As an example, a movable shutter can be immune to hacking, tampering, or hijacking via a computer network.

As an example, a movable shutter may optionally be coupled to circuitry that can cause the movable shutter to move from one position to another position where such circuitry can cause movement via one or more mechanical components. In such an example, the movable shutter may also be movable manually (e.g., by a user's hand). As an example, consider an electromagnetic biasing component that can be activated via a button, via a keystroke of a keyboard, via operation of an application, via a browsing operation, etc., to biasably cause a movable shutter to move. As to a button, consider a button that is operatively coupled to dedicated circuitry for moving a movable shutter such that the button cannot be hijacked. As another example, consider an application that includes a private mode (e.g., a secure mode) where a user desires privacy. In such an example, upon launching the application, an operating system may cause a movable shutter to move to a position that obscures a camera and that electrically decouples at least the camera (e.g., as to power, data, etc.). Where a movable shutter can be moved through operation of circuitry, that circuitry can be independent of a switch or switches that can be switched by movement of the movable shutter (see, e.g., FIG. 12). In such an example, where the circuitry is hijacked, a user can observe physical movement of the movable shutter where such physical movement is inappropriately caused by the hijacking, which may be a clear indication that such hijacking has occurred, which, in turn, may operate as a disincentive to hijack.

A device can include a processor; memory accessible to the processor; a display operatively coupled to the processor; a bezel that defines a bezel region and a display region for the display; one or more media capture components where the one or more media capture components include a camera operatively coupled to the processor, where the camera includes an aperture disposed in the bezel region that defines a field of view; a switch that includes an operational state for a circuit electrically coupled to the at least one of the one or more media capture components and a nonoperational state for the circuit; and a movable shutter disposed in the bezel region that controls the switch, where the movable shutter includes a closed orientation with respect to the aperture of the camera that obscures the field of view and that corresponds to the nonoperational state of the switch and an open orientation with respect to the aperture of the camera that does not obscure the field of view and that corresponds to the operational state of the switch.

As an example, for a nonoperational state of a switch, a circuit can be electrically incomplete. As an example, for a nonoperational state of a switch, a circuit can be electrically shorted, for example, where the circuit is electrically shorted to ground (e.g., consider a ground fault, etc.).

As an example, a switch can be a power switch where an operational state of the switch supplies operational power to at least one of one or more media capture components and where a nonoperational state of the switch does not supply operational power to the at least one of the one or more media capture component.

As an example, a switch can be a reed switch. As an example, a device can include a magnet where, for example, a movable shutter can include the magnet. As an example, a device can include a magnet where the magnet is stationary (e.g., fixed to the device such that it does not move independent of the device). As an example, a device can include a stationary magnet and a movable switch, for example, consider a movable shutter that includes a switch that moves with the shutter.

As an example, a switch can include a Hall effect sensor and/or a magnetoresistive sensor. As an example, a switch can include a threshold detector operatively coupled to a sensor.

As an example, an operational state of a switch can be a normal state of the switch. As an example, an operational state of a switch can depend on the presence of a magnetic field that is greater than the Earth's magnetic field. As an example, a nonoperational state of a switch can be a normal state of the switch. As an example, a nonoperational state of a switch can depend on the presence of a magnetic field that is greater than the Earth's magnetic field.

As an example, a media capture component can be or can include a camera. As an example, a media capture component can be or can include a microphone. As an example, a device can include a microphone disposed in a bezel region of a bezel.

As an example, a device can include a display that is operable in a nonoperational state of a switch that is controlled by a movable shutter. In such an example, in a closed orientation of the movable shutter, the movable shutter can be positioned such that it does not obscure the display.

As an example, a device can include a display housing and a keyboard housing coupled via a hinge assembly. In such an example, the display, a switch and a movable shutter can be disposed in the display housing where the display housing includes a bezel.

As an example, a device can include a tablet housing where a display, a switch and a movable shutter are disposed in the tablet housing where the tablet housing includes a bezel.

As an example, a movable shutter can include a grip. In such an example, the grip can be accessible via an opening in a bezel and/or the grip may extend outwardly beyond a surface of a bezel. As an example, a bezel can include a front surface and an edge surface where a grip may be a front grip and/or an edge grip (see, e.g., FIG. 5, FIG. 6, FIG. 7, FIG. 10, FIG. 11, etc.).

As an example, a device can include a battery where a switch is operatively coupled to the battery via at least one wire.

As an example, a device can include a processor; memory accessible to the processor; a display operatively coupled to the processor; a bezel that defines a bezel region and a display region for the display; a camera operatively coupled to the processor, where the camera includes an aperture disposed in the bezel region that defines a field of view; a power switch operatively coupled to the camera, where the power switch includes an on-state that supplies operational power to the camera and an off-state that does not supply operational power to the camera; and a movable shutter disposed in the bezel region that controls the power switch, where the movable shutter includes a closed orientation with respect to the aperture of the camera that obscures the field of view and that corresponds to the off-state of the power switch and an open orientation with respect to the aperture of the camera that does not obscure the field of view and that corresponds to the on-state of the power switch.

As an example, a device can include a processor; memory accessible to the processor; a display operatively coupled to the processor; a bezel that defines a bezel region and a display region for the display; a camera operatively coupled to the processor, where the camera includes an aperture disposed in the bezel region that defines a field of view; a microphone operatively coupled to the processor; a power switch operatively coupled to the microphone, where the power switch includes an on-state that supplies operational power to the microphone and an off-state that does not supply operational power to the microphone; and a movable shutter disposed in the bezel region that controls the power switch, where the movable shutter includes a closed orientation with respect to the aperture of the camera that obscures the field of view and that corresponds to the off-state of the power switch and an open orientation with respect to the aperture of the camera that does not obscure the field of view and that corresponds to the on-state of the power switch.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 14:
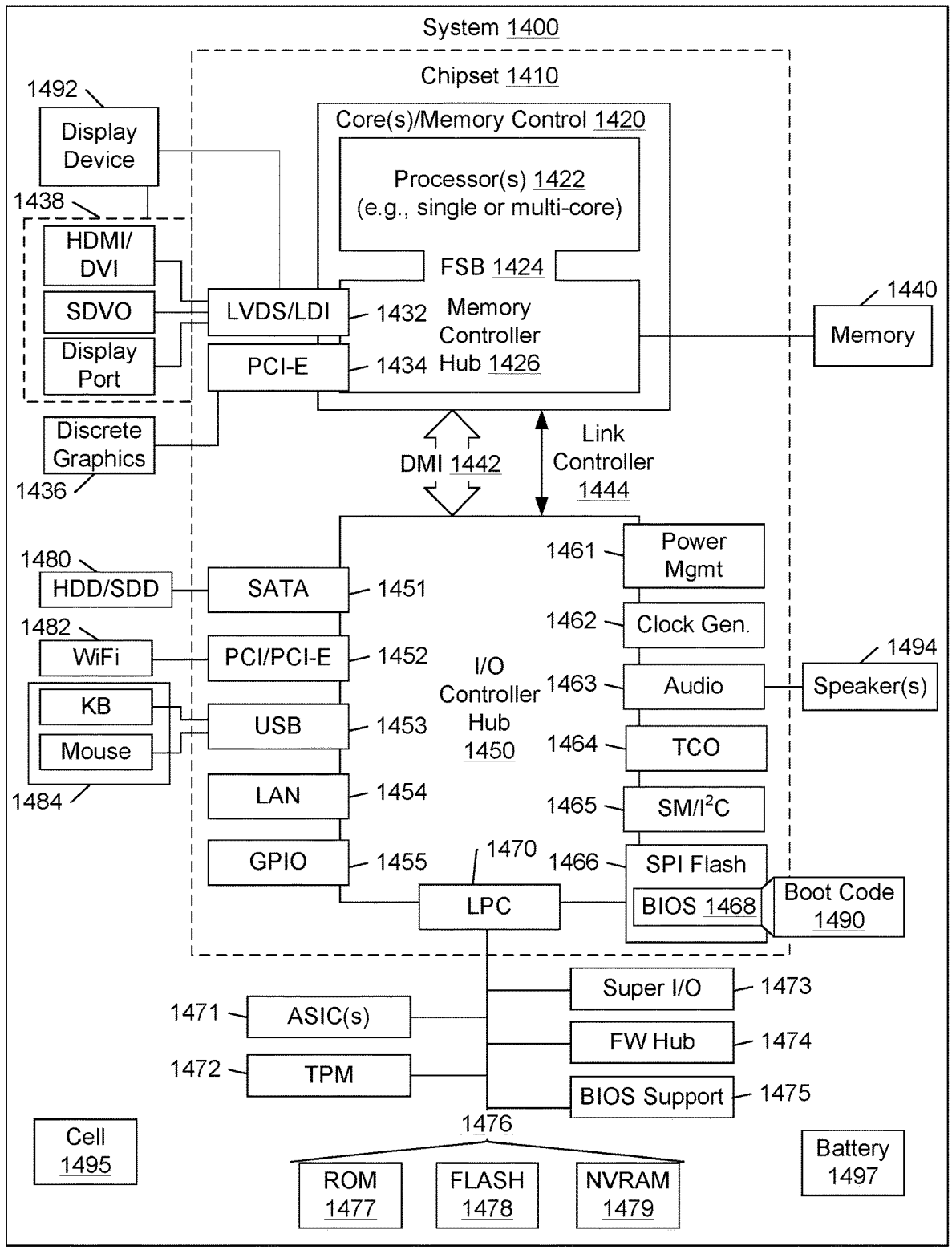
FIG. 14 is a diagram of an example of a system that includes one or more processors.

While various examples of circuits or circuitry have been discussed, FIG. 14 depicts a block diagram of an illustrative computer system 1400. The system 1400 may be a desktop computer system, such as one of the THINKCENTRE® or THINKPAD® series of personal computers sold by Lenovo (US) Inc. of Morrisville, N.C., or a workstation computer, such as the THINKSTATION®, which are sold by Lenovo (US) Inc. of Morrisville, N.C.; however, as apparent from the description herein, a satellite, a base, a server or other machine may include other features or only some of the features of the system 1400.

As an example, a device may include features such as one or more of the features included in one of the LENOVO® IDEADCENTRE® or THINKCENTRE® "all-in-one" (AIO) computing devices (e.g., sold by Lenovo (US) Inc. of Morrisville, N.C.). For example, the LENOVO® IDEADCENTRE® A720 computing device includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner.

As shown in FIG. 14, the system 1400 includes a so-called chipset 1410. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 14, the chipset 1410 has a particular architecture, which may vary to some extent depending on brand or manufacturer. The architecture of the chipset 1410 includes a core and memory control group 1420 and an I/O controller hub 1450 that exchange information (e.g., data, signals, commands, etc.) via, for example, a direct management interface or direct media interface (DMI) 1442 or a link controller 1444. In the example of FIG. 14, the DMI 1442 is a chip-to-chip interface (sometimes referred to as being a link between a "northbridge" and a "southbridge").

The core and memory control group 1420 include one or more processors 1422 (e.g., single core or multi-core) and a memory controller hub 1426 that exchange information via a front side bus (FSB) 1424. As described herein, various components of the core and memory control group 1420 may be integrated onto a single processor die, for example, to make a chip that supplants the conventional "northbridge" style architecture.

The memory controller hub 1426 interfaces with memory 1440. For example, the memory controller hub 1426 may provide support for DDR SDRAM memory (e.g., DDR, DDR2, DDR3, etc.). In general, the memory 1440 is a type of random-access memory (RAM). It is often referred to as "system memory".

The memory controller hub 1426 further includes a low-voltage differential signaling interface (LVDS) 1432. The LVDS 1432 may be a so-called LVDS Display Interface (LDI) for support of a display device 1492 (e.g., a CRT, a flat panel, a projector, etc.). A block 1438 includes some examples of technologies that may be supported via the LVDS interface 1432 (e.g., serial digital video, HDMI/DVI, display port). The memory controller hub 1426 also includes one or more PCI-express interfaces (PCI-E) 1434, for example, for support of discrete graphics 1436. Discrete graphics using a PCI-E interface has become an alternative approach to an accelerated graphics port (AGP). For example, the memory controller hub 1426 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1450 includes a variety of interfaces. The example of FIG. 14 includes a SATA interface 1451, one or more PCI-E interfaces 1452 (optionally one or more legacy PCI interfaces), one or more USB interfaces 1453, a LAN interface 1454 (more generally a network interface), a general purpose I/O interface (GPIO) 1455, a low-pin count (LPC) interface 1470, a power management interface 1461, a clock generator interface 1462, an audio interface 1463 (e.g., for speakers 1494), a total cost of operation (TCO) interface 1464, a system management bus interface (e.g., a multi-master serial computer bus interface) 1465, and a serial peripheral flash memory/controller interface (SPI Flash) 1466, which, in the example of FIG. 14, includes BIOS 1468 and boot code 1490. With respect to network connections, the I/O hub controller 1450 may include integrated gigabit Ethernet controller lines multiplexed with a PCI-E interface port. Other network features may operate independent of a PCI-E interface.

The interfaces of the I/O hub controller 1450 provide for communication with various devices, networks, etc. For example, the SATA interface 1451 provides for reading, writing or reading and writing information on one or more drives 1480 such as HDDs, SDDs or a combination thereof. The I/O hub controller 1450 may also include an advanced host controller interface (AHCI) to support one or more drives 1480. The PCI-E interface 1452 allows for wireless connections 1482 to devices, networks, etc. The USB interface 1453 provides for input devices 1484 such as keyboards (KB), one or more optical sensors, mice and various other devices (e.g., microphones, cameras, phones, storage, media players, etc.). On or more other types of sensors may optionally rely on the USB interface 1453 or another interface (e.g., $I^2C$, etc.). As to microphones, the system 1400 of FIG. 14 may include hardware (e.g., audio card) appropriately configured for receipt of sound (e.g., user voice, ambient sound, etc.).

In the example of FIG. 14, the LPC interface 1470 provides for use of one or more ASICs 1471, a trusted platform module (TPM) 1472, a super I/O 1473, a firmware hub 1474, BIOS support 1475 as well as various types of memory 1476 such as ROM 1477, Flash 1478, and non-volatile RAM (NVRAM) 1479. With respect to the TPM 1472, this module may be in the form of a chip that can be used to authenticate software and hardware devices. For example, a TPM may be capable of performing platform authentication and may be used to verify that a system seeking access is the expected system.

The system 1400, upon power on, may be configured to execute boot code 1490 for the BIOS 1468, as stored within the SPI Flash 1466, and thereafter processes data under the control of one or more operating systems and application software (e.g., stored in system memory 1440). An operating system may be stored in any of a variety of locations and accessed, for example, according to instructions of the BIOS 1468. Again, as described herein, a satellite, a base, a server or other machine may include fewer or more features than shown in the system 1400 of FIG. 14. Further, the system 1400 of FIG. 14 is shown as optionally include cell phone circuitry 1495, which may include GSM, CDMA, etc., types of circuitry configured for coordinated operation with one or more of the other features of the system 1400. Also shown in FIG. 14 is battery circuitry 1497, which may provide one or more battery, power, etc., associated features (e.g., optionally to instruct one or more other components of the system 1400). As an example, a SMBus may be operable via a LPC (see, e.g., the LPC interface 1470), via an $I^2C$ interface (see, e.g., the SM/$I^2C$ interface 1465), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
a processor;
memory accessible to the processor;
a display operatively coupled to the processor;
a bezel that defines a bezel region and a display region for the display;
media capture components wherein the media capture components comprise a camera, as a first media capture component, operatively coupled to the processor, wherein the camera comprises an aperture disposed in the bezel region that defines a field of view, and a second media capture component;
switches electrically coupled to the media capture components; and
a movable shutter disposed in the bezel region that controls the switches, wherein the movable shutter comprises a first position wherein the first media capture component is enabled and the second media capture component is disabled, a second position wherein the first and the second media capture components are enabled, a third position wherein the first media capture component is disabled, the movable shutter obscures the field of view and the second media capture component is enabled, and a fourth position wherein the first and the second media capture components are disabled and the movable shutter obscures the field of view.

2. The device of claim 1 wherein the movable shutter controls at least one of the switches to electrically short at least one of the media capture components.

3. The device of claim 2 wherein, the electrical short is to ground.

4. The device of claim 1 wherein the switches comprise at least one reed switch.

5. The device of claim 4 comprising a magnet.

6. The device of claim 5 wherein the movable shutter comprises the magnet.

7. The device of claim 5 wherein the magnet is stationary.

8. The device of claim 4 wherein the movable shutter comprises at least one of the switches.

9. The device of claim 1 wherein the switches comprise at least one sensor.

10. The device of claim 1 wherein an operational state of one of the switches is a normal state of the switch.

11. The device of claim 1 wherein an operational state of one of the switches depends on the presence of a magnetic field that is greater than the Earth's magnetic field.

12. The device of claim 1 wherein a nonoperational state of one of the switches is a normal state of the switch.

13. The device of claim 1 wherein a nonoperational state of one of the switches depends on the presence of a magnetic field that is greater than the Earth's magnetic field.

14. The device of claim 1 wherein the second media capture component comprises a microphone.

15. The device of claim 14 wherein the microphone is disposed in the bezel region.

16. The device of claim 1 wherein the movable shutter does not obscure the display.

17. The device of claim 1 comprising a display housing and a keyboard housing coupled via a hinge assembly, wherein the display, the switches and the movable shutter are disposed in the display housing and wherein the display housing comprises the bezel.

18. The device of claim 1 comprising a tablet housing, wherein the display, the switches and the movable shutter are disposed in the tablet housing and wherein the tablet housing comprises the bezel.

19. The device of claim 1, wherein the switches comprise two switches and wherein for the third position of the movable shutter, at least one magnetic field of the movable shutter controls the two switches to enable the first and the second media capture components.

20. The device of claim 1, wherein the switches comprise two switches and wherein for the fourth position of the movable shutter, at least one magnetic field of the movable shutter controls one of the switches to enable the first media capture component and wherein for the second position of the movable shutter, the at least one magnetic field of the movable shutter controls another one of the switches to enable the second media capture component.

* * * * *